US010632728B2

(12) United States Patent
Collins

(10) Patent No.: US 10,632,728 B2
(45) Date of Patent: Apr. 28, 2020

(54) SEPARATING POLYMER FROM COMPOSITE STRUCTURES

(71) Applicant: Dennis Martin Collins, Alfredton (AU)

(72) Inventor: Dennis Martin Collins, Alfredton (AU)

( * ) Notice: Subject to any disclaimer, the term of this patent is extended or adjusted under 35 U.S.C. 154(b) by 0 days.

(21) Appl. No.: 16/327,036

(22) PCT Filed: Aug. 24, 2017

(86) PCT No.: PCT/AU2017/050896

§ 371 (c)(1),
(2) Date: Feb. 21, 2019

(87) PCT Pub. No.: WO2018/035565

PCT Pub. Date: Mar. 1, 2018

(65) Prior Publication Data

US 2019/0202193 A1 Jul. 4, 2019

(30) Foreign Application Priority Data

Aug. 25, 2016 (AU) ................................ 2016903391

(51) Int. Cl.

*B32B 43/00* (2006.01)
*B29B 17/02* (2006.01)
*C08J 11/08* (2006.01)

(52) U.S. Cl.

CPC ............ *B32B 43/006* (2013.01); *B29B 17/02* (2013.01); *B29B 17/0206* (2013.01); *C08J 11/08* (2013.01); *B29B 2017/0203* (2013.01); *C08J 2323/06* (2013.01); *C08J 2323/12* (2013.01); *C08J 2327/06* (2013.01); *C08J 2367/00* (2013.01); *Y02P 20/582* (2015.11); *Y02W 30/528* (2015.05); *Y02W 30/622* (2015.05); *Y02W 30/68* (2015.05); *Y02W 30/701* (2015.05);

(Continued)

(58) Field of Classification Search

CPC .......... Y10T 156/1111; Y10T 156/1116; Y10T 156/1153; B29B 2017/0286

See application file for complete search history.

(56) References Cited

U.S. PATENT DOCUMENTS 2,324,980 A 7/1943 Kilbourne, Jr.
4,385,997 A 5/1983 Stradal (Continued)

OTHER PUBLICATIONS

International Search Report and Written Opinion dated Oct. 4, 2017, for International Application No. PCT/AU2017/050896, 8 pages.

*Primary Examiner* — Mark A Osele

(57) ABSTRACT

The present invention provides a method of promoting separation of polymer bonded to a substrate of different material, which collectively form at least part of a polymer composite structure, the method comprising: (1) contacting the polymer composite structure with a composition comprising organic solvent which is absorbed within one or both of the polymer and substrate, wherein the composition comprising organic solvent does not dissolve either the polymer or the substrate, and (2) contacting the polymer composite structure provided in step (1) with liquid (i) having a temperature higher than the boiling point of the composition comprising organic solvent used in step (1), and (ii) that does not dissolve either the polymer or the substrate, the action of which promotes separation between the polymer and the substrate.

17 Claims, 2 Drawing Sheets

(52) U.S. Cl.
CPC ..... *Y10T 156/1111* (2015.01); *Y10T 156/1116* (2015.01); *Y10T 156/1153* (2015.01)

(56) References Cited

U.S. PATENT DOCUMENTS

| | | | |
|---|---|---|---|
| 4,614,752 | A | 9/1986 | Fuchs et al. |
| 6,722,593 | B1 | 4/2004 | Dobozy |
| 2013/0118691 | A1 | 5/2013 | George et al. |
| 2018/0257267 | A1 * | 9/2018 | Aymonier ............... B29B 17/02 |

* cited by examiner

SEPARATING POLYMER FROM COMPOSITE STRUCTURES

CROSS-REFERENCE TO RELATED APPLICATIONS

This application is a U.S. national phase application of International Patent Application No. PCT/AU2017/050896, filed Aug. 24, 2017, which claims the benefit of priority to Australian Application No. 2016903391, filed Aug. 25, 2016, the contents of each of which are hereby incorporated herein by reference in their entirety.

FIELD OF THE INVENTION

The present invention relates in general to separating polymer from composite structures. In particular, the invention relates to a method of promoting separation of polymer bonded to a substrate of different material, the collective of which forms at least part of a polymer composite structure. By promoting that separation, the polymer can be more readily isolated from the composite structure for subsequent recycling.

BACKGROUND OF THE INVENTION

Polymers are wildly used in modern day society. In view of such wide spread use, considerable effort has been applied to developing techniques for effectively and efficiently recycling waste polymer.

There are currently well developed techniques for recycling many different types or classes of waste polymer (e.g. polyethylene terephthalate (PET) and polyethylene (PE) that are commonly in the form of containers such as bottles).

Conventional recycling methodology typically involves sourcing waste polymer feedstock. It is not uncommon for that waste feedstock to contain two or more different polymers and potentially non-polymer material.

It is often of critical importance that methodology applied to recycling polymers separates the waste polymer feedstock into different materials to afford polymer streams that are not "contaminated" with different polymer types or non-polymer material. The isolated "clean" polymer stream can then be on sold and processed into a recycled product.

Producing a "clean" polymer stream can be of particular importance because subsequent processing of the polymer into a recycled product can be adversely effected if the polymer contains foreign material such a different polymer or non-polymer material. In particular, each class of polymer (e.g. PET and PE) has a different chemical composition and consequently different properties. These differences typically make polymer mixtures incompatible for being processed together into a recycled product.

Consequently, polymer recycling typically includes methodology for isolating target polymer from mixed waste feedstock. For example, various sensors may be used to assist with bulk sorting the mixed waste feedstock into different classes of polymer. Furthermore, after undergoing such a bulk sorting process, the resulting waste feedstock is typically comminuted and then subjected to further processing to remove any residual contamination. Such further processing is typically categorised as a "wet" or "dry" technique. Float tanks are the most common wet technique in which the comminuted material is separated based on density (i.e. whether it sinks or floats). Cyclone technology is perhaps the most common dry technique used in which the comminuted material is subjected to centrifugal force to separate the material according to weight.

While recycling of waste polymer is now common place, the methodology employed is typically reliant upon the waste polymer feedstock containing target polymer that can be readily physically separated from other components/contaminants in the waste feedstock.

However, many polymer products are produced where the polymer component is bonded to a different substrate material and can not be readily separated and isolated from that substrate material. For example, there is a diverse range of polymer composite structures in which polymer is bonded to a substrate material of different composition. Such polymer composite structures include, for example, laminated polymer composite structures.

While it would be desirable to recycle polymer composite structures in which the polymer is bonded to a different substrate material, conventional recycling methodologies have great difficulty with that task and consequently waste polymer composite structures often end up in landfill.

As a case in point, laminated polyester/polyvinyl chloride composite structures are widely used as trailer side curtains, roll-over tarpaulins, banners, awnings, matting, and general covers. Significant volume of this so called "PVC fabric" is produced annually. While it would be desirable to recycle one or both of the polyester and polyvinyl chloride components of such composite structures, separating and isolating one or both of the polymer components remains problematic. A large volume of such polymer composite structures is therefore diverted to landfill.

An opportunity therefore remains to develop methodology for separating polymer from polymer composite structures to facilitate recycling.

SUMMARY OF THE INVENTION

The present invention provides a method of promoting separation of polymer bonded to a substrate of different material, which collectively form at least part of a polymer composite structure, the method comprising:

(1) contacting the polymer composite structure with a composition comprising organic solvent which is absorbed within one or both of the polymer and substrate, wherein the composition comprising organic solvent does not dissolve either the polymer or the substrate, and (2) contacting the polymer composite structure provided in step (1) with liquid (i) having a temperature higher than the boiling point of the composition comprising organic solvent used in step (1), and (ii) that does not dissolve either the polymer or the substrate, the action of which promotes separation between the polymer and the substrate.

Surprisingly, it has now been found possible to promote separation between polymer bonded to a substrate of different material, which collectively form at least part of a polymer composite structure, by first absorbing a composition comprising organic solvent within one or both of the polymer and substrate and then contacting the resulting polymer composite structure with liquid having a temperature higher than the boiling point of the composition.

Without wishing to be limited by theory, it is believed the action in step (2) of contacting the polymer composite structure with liquid having a boiling point higher than the composition absorbed within one or both of the polymer and substrate causes that composition to rapidly vaporise and induce significant internal pressure within composite structure. That induced internal pressure, coupled possibly with a plasticising effect of the composition on at least the polymer to be separated can cause the polymer to be separated to bubble, blister or foam and at least in part separate from the substrate.

After performing the method, if the polymer that is to be separated has not completely separated from the substrate, complete separation can be achieved, for example, by subjecting the treated polymer composite structure to shear and/or comminution. The separated polymer can then be isolated using techniques known in the art such float tanks, Eddy current or cyclones.

In one embodiment, the polymer is bonded to a non-polymer substrate. Examples of such non-polymer substrates include, but are not limited to, metal (for example metal foil or wire), glass fibre, carbon fibre, paper, cardboard and combinations thereof.

In another embodiment, the polymer is bonded to a polymer substrate. In that case, according to the method of the invention, that polymer substrate is a different polymer to the polymer bonded to the substrate.

In a further embodiment, the polymer is directly bonded to a polymer substrate and that polymer substrate is in turn bonded to a non-polymer substrate. The polymer may therefore be described as being bonded to a composite substrate (i.e. the collective of the polymer substrate bonded to a non-polymer substrate).

In one embodiment, the polymer bonded to a substrate of different material forms part of a polymer matrix of the composite structure and the substrate is located within that polymer matrix. For example, the substrate may be encapsulated by polymer matrix of the polymer.

In a further embodiment, the polymer composite structure is a laminate and the polymer and substrate to which it is bonded form layers of the laminate.

In yet a further embodiment, the polymer composite structure is a laminate in which the substrate is located in between two layers of the polymer.

In one embodiment, the method comprises a further step of (3) subjecting the polymer composite structure provided in step (2) to shear forces and/or comminution and then isolating as separate components the polymer and the substrate. In that embodiment, the polymer and substrate components may be isolated using a float tank, Eddy current or cyclone.

The polymer may be selected from polyvinyl halide, polyester, polyolefin, polyamide, styrenic polymer, rubber, combinations and copolymers thereof. Specific examples include polyvinyl chloride, polyvinylidene chloride, polyvinyl fluoride, polyethylene, polypropylene, polystyrene, polyethylene terephthalate, polylactic acid, nylon, natural rubber and synthetic rubber.

The substrate may be selected from metal, polymer, glass fibre, carbon fibre, paper, cardboard and combinations thereof.

The substrate may be a composite structure in itself in that it is made up of one material bonded to a different material.

Where the substrate is or comprises polymer, that polymer may be selected from polymer herein described.

The composition used in step (1) may comprise organic solvent selected from aliphatic hydrocarbons, cyclic hydrocarbons, aromatic hydrocarbons, ketones, aldehydes, alcohols, ethers, esters, cyanoalkanes, halogenated alkanes, halogenated alkenes, and combinations thereof.

Specific examples of organic solvents that may be used include pentane, hexane, petroleum ether, cyclohexane, benzene, toluene, xylene, cyclohexanone, acetone, methyl ethyl ketone, acetaldehyde, ethanol, methanol, diethylether, acetonitrile, 1,1,1-trichloroethane, chloroform, dichloromethane, carbon tetrachloride, trichloroethylene, and combinations thereof.

The liquid used in step (2) having a temperature higher than the boiling point of the composition used in step (1) may be selected from the aforementioned organic solvents, water, natural or synthetic oil, and combinations thereof.

Further aspects and embodiments of the invention are described in more detail below.

BRIEF DESCRIPTION OF THE DRAWINGS

The invention will herein be described with reference to the following non-limiting drawings in which.

DETAILED DESCRIPTION OF THE INVENTION

Figure 1:
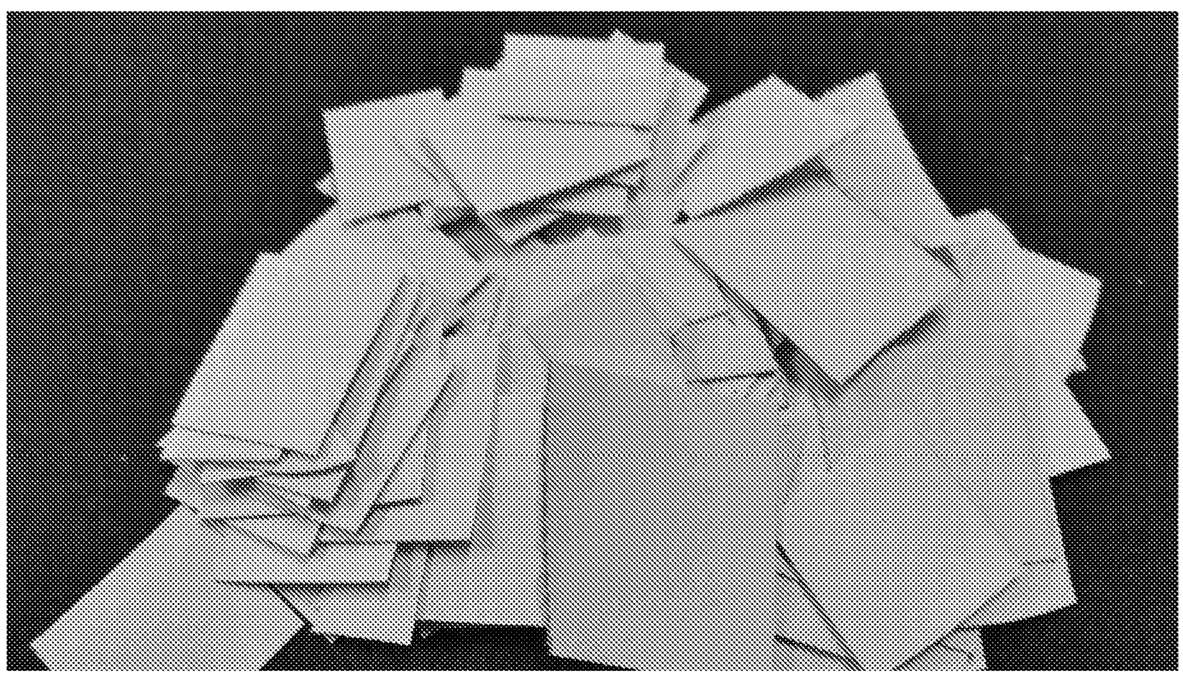
FIG. 1—illustrates a polymer composite structure suitable for use in accordance with the invention in the form of a laminate having a polyvinyl chloride/polyester/polyvinyl chloride laminate structure.

The method according to the invention promotes separation between polymer and the substrate to which the polymer is bonded. By "promoting separation" between the polymer and substrate is meant that at least part of the surface area of polymer bonded to the substrate separates from the substrate so as to no longer be bonded thereto. By way of example only, performing the method of the invention may cause the polymer bonded to the substrate to foam, blister or bubble thereby de-bonding at least part of the surface area of the polymer that is bonded to the substrate.

By the polymer to be separated being "bonded" to a substrate of different material is meant that polymer is physically and/or chemically adhered to the substrate material.

The polymer may be bonded directly or indirectly to the substrate. Where the polymer is bonded indirectly to the substrate, that bonding may occur through an adhesive layer.

Bonding of the polymer to the substrate material may simply occur by virtue of molten polymer, or polymer in solvent, being applied to the substrate material.

There is no particular limitation concerning the nature of polymer that can be bonded to a given substrate. Examples of suitable polymers include, but are not limited to, polyvinyl halide, polyester, polyolefin, polyamide, styrenic polymer, rubber, combinations and copolymers thereof. More specific examples include, but are not limited to, polyvinyl chloride, polyvinylidene chloride, polyvinyl fluoride, polyethylene, polypropylene, polystyrene, polyethylene terephthalate, polylactic acid, nylon, natural rubber and synthetic rubber.

The polymer bonded to the substrate may be thermoplastic. Where the substrate is or comprises polymer, that polymer may also be thermoplastic.

In one embodiment, the polymer bonded to the substrate is thermoplastic.

Those skilled in the art will appreciate thermoplastic polymer can be more amenable than thermoset polymer to absorbing composition comprising organic solvent.

The polymer is bonded to a substrate of different material. By the substrate being "of different material" is intended to mean the material of the substrate that is directly bonded to the polymer is not of the same material as that polymer. The substrate may nevertheless still be or comprise polymer. The substrate may be a composite structure in itself. For example, the present invention is intended to embrace using polymer composite structures comprising (i) polymer bonded to a different polymer substrate, (ii) polymer bonded to a non-polymer substrate, and (iii) polymer bonded to a composite substrate.

Provided the polymer can be bonded to the substrate, there is no particular limitation on the physical or compositional form of the substrate. For example, the substrate may be in the form of a continuous sheet material (such as a polymer sheet/film or metal foil), metal wire, fibre or collection of fibres (such as yarn, paper, cardboard or fabric). The substrate may also be contained within or encapsulated by the polymer to which it is bonded.

In one embodiment, the substrate is selected from metal, polymer, rubber, glass fibre, carbon fibre, paper, cardboard and combinations thereof.

In another embodiment, the substrate comprises metal foil, for example aluminium foil, or metal wire.

In yet a further embodiment, the substrate is or comprises polymer. Where the substrate is polymer, that polymer will of be different polymer to the polymer bonded to the substrate. In particular, the present invention is intended to separate polymer from a different substrate material. Where the polymer bonded to the substrate is the same polymer as the substrate, the collective composite structure will in effect be made of the same polymer and there is likely to be no practical reason to separate the polymer from the substrate material. Suitable polymer substrates include those described herein for the polymer that is bonded to the substrate.

In a further embodiment, the substrate comprises paper and/or cardboard.

The polymer which is bonded to the substrate forms at least part of a polymer composite structure. Such polymer composite structures are well known to those skilled in the art.

For example, the polymer composite structure may comprise the substrate located within polymer matrix of the polymer to which it is bonded. In that case, the substrate will often be used as a reinforcement material for the polymer.

In one embodiment, the substrate of the polymer composite structure is located within polymer matrix of the polymer to which it is bonded.

Alternatively, the polymer composite structure may be a laminate in which the polymer and substrate form layers or sheets of the laminate. In that case, the substrate may also be used as a reinforcement material for the polymer.

In one embodiment, the polymer composite structure is a laminate in which the polymer is in the form of a layer bonded to the substrate which is also in the form of a layer.

In a further embodiment, the substrate is in the form of or comprises a metal foil layer, polymer layer, paper layer, cardboard layer or combination thereof.

In another embodiment, the substrate is a composite comprising a metal foil layer bonded to a polymer layer.

The polymer composite structure may be a laminate in which the substrate is a layer located in between two layers of the polymer. For example, the polymer composite structure may be a laminate having an A/B/A structure, where A represents the polymer and B represents the substrate.

The polymer composite structure may be a laminate in which the polymer is a layer bonded to a composite substrate layer. For example, the polymer composite structure may be a laminate having an A/B/C structure, where A represents the polymer bonded to the composite substrate B/C. In that case, B could be a non-polymer layer bonded to a polymer layer C (C may be the same or different to polymer A). B may also be a polymer layer provided it is different to polymer A. In that case, B could be a polymer layer bonded to a polymer or non-polymer layer C.

In one embodiment, the polymer composite structure is a laminate comprising polyvinyl halide, polyester, polyolefin, polyamide, styrenic polymer, rubber, combinations and copolymers thereof.

In a further embodiment, the polymer composite structure is a laminate comprising an A/B/C laminate structure where A represents polyvinyl chloride or polyvinylidene chloride, B represents polyethylene or polypropylene and C represents metal foil.

In another embodiment, the polymer composite structure is a laminate in which the substrate is located in between two layers of the polymer. In that case, the two polymer layers may be the same and each are bonded to opposing sides of the substrate. While each of the two polymer layers bonded to the substrate may be the same, the substrate itself will be of different material to one or both of those two polymer layers.

Where the polymer composite is a laminate in which the substrate is located in between two layers of the polymer, one or both of the two polymer layers may absorb the composition comprising organic solvent. Furthermore, the substrate may also absorb the composition comprising organic solvent.

The polymer bonded to the substrate forms at least part of the composite structure. In some embodiments, the substrate and polymer bonded thereto represents the entire polymer composite structure. For example, the polymer composite structure may be in the form of a laminate in which the polymer is bonded to a metal foil substrate. Alternatively, the polymer composite structure may be in the form of a laminate in which two polymer layers are bonded to opposing sides of the substrate, for example a polymer substrate layer.

The polymer composite structure may also be in the form of a tube in which the substrate is located within the polymeric matrix of the polymer bonded thereto.

In a further embodiment, the polymer composite structure is a laminate comprising polymer bonded to paper or cardboard.

In another embodiment, the polymer composite structure is a laminate comprising an A/B laminate structure where A represents polyolefin or polyester and B represents paper and/or cardboard substrate.

In a further embodiment, the polymer composite structure is a tyre comprising rubber bonded to polymer fibre and/or metal wire.

In another embodiment, the polymer composite structure is a polymer coated metal wire.

Provided the polymer composite structure can be processed according to the method of the invention, there is no particular limitation on the size of the polymer composite structure that can be employed. The size of polymer composite structure used in the method will often depend on the size of the polymer composite structure actually provided and the nature of the processing equipment used. If required, the polymer composite structure can be comminuted used equipment known in the art prior to it being used in the method of the invention.

The method according to the invention involves contacting the polymer composite structure with a composition comprising organic solvent. By "contacting" in that context is meant the polymer composite structure is placed in direct physical contact with the composition. For example, the polymer composite structure could be placed in a vessel containing the composition so as to submerge the structure within the composition. Alternatively, the polymer composite structure could be placed into a vessel and the composition applied to the composite structure so as to submerge the structure within the composition.

Contacting the polymer composite structure with the composition of course includes contacting the polymer bonded to the substrate and the substrate with the composition.

The composition comprises organic solvent. The expression "organic solvent" used herein is intended to take its conventional meaning within the art.

The composition will generally comprise greater than: 50 wt. %, or 60 wt. %, or 70 wt. %, or 80 wt. %, or 90 wt. %, or 95 wt. % organic solvent.

Where the organic solvent used in the composition is miscible with water, the composition may also contain water. If used, water will generally be present in the composition in an amount of less than: 50 wt. %, or 40 wt. %, or 30 wt. %, or 20 wt. %, or 10 wt. %, or 5 wt. %.

In one embodiment, the composition is substantially free of water.

In another embodiment, the composition consists essentially of organic solvent.

Organic solvent used in the composition may be a mixture of different organic solvents.

The composition may comprise organic solvent selected from aliphatic hydrocarbons, cyclic hydrocarbons, aromatic hydrocarbons, ketones, aldehydes, alcohols, ethers, esters, cyanoalkanes, halogenated alkanes, halogenated alkenes, and combinations thereof.

Specific examples of organic solvents that may be used include, but are not limited to, pentane, hexane, petroleum ether, cyclohexane, benzene, toluene, xylene, cyclohexanone, acetone, methyl ethyl ketone, acetaldehyde, ethanol, methanol, diethylether, acetonitrile, 1,1,1-trichloroethane, chloroform, dichloromethane, carbon tetrachloride, trichloroethylene, and combinations thereof.

The composition comprising organic solvent used herein is absorbed within the polymer and/or substrate. By being "absorbed" within one or both of the polymer and substrate is meant molecules of the composition are taken up within the matrix material of the polymer and/or substrate. To accommodate the composition within matrix material of the polymer or substrate, the polymer or substrate will typically undergo an increase in volume. In the art, that process is often referred to as the polymer or substrate becoming "swollen" or "swelling" with the composition.

Those skilled in the art will appreciate that for the composition to be absorbed within a polymer or substrate material, that composition should be suitably compatible with the polymer or substrate material to facilitate such absorption. For example, a non-polar substrate or polymer will absorb little if any polar composition. In other words, a polar composition will induce little if no swelling of a non-polar substrate or polymer.

In the context of polymer, those skilled in the art will appreciate it will inherently comprise polymer matrix formed of polymer chains. Composition absorbed within the polymer will therefore be located within and throughout polymer matrix of the polymer.

Those skilled in the art will be able to select a suitable composition for use with a given polymer or substrate to ensure the composition is absorbed within its matrix material.

Parameters which dictate whether a composition will be absorbed within a given material are well known in the art and include, for example, the polarity of the composition, the polarity of the material and temperature. For example, acetone could be selected as a composition to be absorbed within polymer matrix of polyvinyl chloride or polyester. In other words, acetone is known to swell polyvinyl chloride and polyester.

Where the substrate is or comprises polymer, one or both of the polymer bonded to the substrate and the polymer substrate may absorb the composition as herein described.

An important feature of the present invention is that the composition comprising organic solvent does not dissolve either the polymer or the substrate. In other words, a situation where the composition does dissolve either the polymer or substrate is not intended to be part of the scope of the present invention.

Just as those skilled in the art will be able to select the composition comprising organic solvent to be absorbed within the polymer or substrate, they will also be able to select the composition such that is does not dissolve the polymer or the substrate.

Parameters which dictate whether a given composition will dissolve a given material are well known in the art and include, for example, the polarity of the composition, the polarity of the material and temperature.

Those skilled in the art will therefore be able to select a suitable composition comprising organic solvent to use in accordance with the present invention to ensure not only does it absorb within the polymer and/or substrate material, but also that it does not dissolve either the polymer or the substrate. In connection with that, those skilled in the art will of course also be cognisant of the temperature at which the invention is performed. For example, the action (swelling or dissolving) of compositions comprising organic solvent on polymers are well known to those skilled in the art.

The step of contacting the polymer composite structure with composition comprising organic solvent may be conducted at ambient temperature.

Provided sufficient composition comprising organic solvent has been absorbed within one or both of the polymer and substrate so as to perform the present invention, there is no particular limitation on the timeframe in which the polymer composite is to remain in contact with the composition. The required timeframe to achieve sufficient absorption will depend on parameters such as the nature of the composition, the nature of the polymer composite structure (e.g thickness) and temperature.

For example, the polymer composite structure can remain in contact with the composition comprising organic solvent for a period of at least 10 seconds, or at least 20 seconds, or at least 40 seconds, or at least 1 minute, or at least 5 minutes, or at least 10 minutes, or at least 20 minutes, or at least 30 minutes, or at least 40 minutes, or at least 50 minutes, or at least one hour, or at least three hours, or at least five hours, or at least seven hours, or at least nine hours, or at least ten hours, or at leave eleven hours, or at least twelve hours, or at least thirteen hours, or at least fourteen hours.

In one embodiment, the polymer composite structure remains in contact with the composition comprising organic solvent for a time period ranging from about 10 seconds to about one minute.

In another embodiment, the polymer composite structure remains in contact with the composition comprising organic solvent for a time period ranging from about 30 minutes to about two hours.

In a further embodiment, the polymer composite structure remains in contact with the composition comprising organic solvent for a time period ranging from about six hours to about twelve hours.

If required, the polymer composite structure may be subjected to a pre-treatment step before step (1) is conducted. For example, where the polymer composite structure is in the form of a polymer/paper laminate, it may be desirable to remove excess paper from the structure by soaking it water.

Having performed step (1), the resulting polymer composite structure will generally be removed from the composition comprising organic solvent (where excess composition is used). For example, the polymer composite structure may be physically removed from the composition, or the composition can be strained away from the composite structure.

In one embodiment, prior to performing step (2), the polymer composite structure is isolated from excess composition comprising organic solvent that is not absorbed within one or both of the polymer and substrate.

According to the method of the invention, the polymer composite structure provided in step (1) is contacted with liquid having a temperature higher than the boiling point of the composition comprising organic solvent used in step (1). By "contacting" in that context is meant the polymer composite structure is placed in direct physical contact with the liquid. For example, the polymer composite structure may be placed in a vessel containing the liquid so as to submerge the structure within the liquid. Alternatively, the polymer composite structure could be placed into a vessel and the liquid applied over the composite structure so as to submerge the structure within the liquid.

Contacting the polymer composite structure with the liquid of course includes contacting the polymer bonded to the substrate and the substrate with the liquid.

It will be appreciated that by the liquid used in step (2) having a temperature higher than the boiling point of the composition comprising organic solvent used in step (1), the liquid used in step (2) will not be the same as the composition comprising organic solvent used in step (1).

An important feature of the present invention is that the liquid used in step (2) does not dissolve either the polymer or the substrate. In other words, a situation where the liquid does dissolve either the polymer or substrate is not intended to be part of the scope of the present invention.

Provided the liquid used in step (2) has a temperature higher than the boiling point of the composition comprising organic solvent used in step (1) and does not dissolve either the polymer or the substrate, there is no particular limitation on the composition of that liquid.

As discussed herein in the context of the composition comprising organic solvent used in step (1), those skilled in the art will be able to readily select a liquid to use in step (2) that does not dissolve either the polymer or the substrate.

In selecting a suitable liquid for use in step (2) those skilled in the art can also readily determine the boiling point of the composition comprising organic solvent used in step (1), thereby ensuring the liquid used has a temperature higher than the boiling point of that composition.

For example, where the composition comprising organic solvent used in step (1) is only a single organic solvent, the boiling point of that solvent will be readily determined or known. Where the composition comprising organic solvent used in step (1) contains organic solvent in combination with one or more other components, the boiling point of that composition solvent can be determined by conventional means such as by measuring it or using a boiling point diagram. Where the composition comprising organic solvent used in step (1) contains organic solvent in combination with one or more other components, and that composition does not have an averaged boiling point that can be determined, then the boiling point of that composition is to be taken as the boiling point of the liquid present in the highest volume %. For example, if the composition comprises 80 vol. % acetone and 20 vol. % ethyl acetate and that mixture does not provide for an averaged boiling point that can be determined, then the boiling point is to be taken as that of acetone. If such a solvent mixture contained an equal vol. % of components, then the boiling point is to be taken as that of the component with the highest boiling point, which in the case of a 50 vol. % acetone and 50 vol. % ethyl acetate mixture would be the boiling point of ethyl acetate.

The boiling point of the composition comprising organic solvent used in step (1) is to be that determined at atmospheric pressure.

The liquid used in step (2) may have a temperature of at least 10° C., at least 15° C., at least 20° C., at least 25° C., at least 35° C., at least 40° C. or at least 45° C. higher than the boiling point of the composition comprising organic solvent used in step (1).

For example, where the composition comprising organic solvent used in step (1) is acetone (boiling point 56° C.), the liquid used in step (2) may be water having a temperature of at least 75° C., or at least 80° C., or at least 90° C., or about 100° C.

Suitable examples of the liquid that may be used in step (2) may be selected from the organic solvents herein described, water, natural or synthetic oil, and combinations thereof.

In one embodiment, the liquid used in step (2) is water.

In a further embodiment, the liquid used in step (2) is water having a temperature of at least 75° C., or at least 80° C., or at least 85° C. or at least 90° C., or at least 95° C.

The action of contacting the polymer composite structure provided in step (1) with liquid used in step (2) having a temperature higher than the boiling point of the composition used in step (1) promotes separation between the polymer and substrate. A key function of that liquid is to provide a rapid transfer of heat to the composite structure so as to promote vaporisation of the composition comprising organic solvent absorbed within the composite structure.

Without wishing to be limited by theory, it is believed the action of contacting the polymer composite structure with liquid having a boiling point higher than the absorbed composition comprising organic absorbed within one or both of the polymer and substrate causes the composition to rapidly vaporise and induce significant internal pressure within the composite structure. That induced internal pressure, coupled possibly with a plasticising effect of the absorbed composition on at least the polymer to be separated, can cause the polymer to be separated to bubble, blister or foam and at least in part separate from the substrate.

In addition to the liquid used in step (2) not dissolving the polymer or substrate, it can be preferable that the liquid is of a type that is also not absorbed by at least the polymer bonded to the substrate.

Without wishing to be limited by theory, it is believed the composition used in step (1), which is absorbed at least into the polymer bonded to the substrate, can impart a plasticising effect to that polymer. When the liquid used in step (2) is applied to the composite structure, heat from that liquid promotes volatilisation of the absorbed composition and, coupled with the plasticising effect, the polymer bonded to the substrate can more readily bubble/blister/foam and lift away from the substrate. Such separation from the substrate in turn facilitates isolating the polymer from the substrate.

Again without wishing to be limited by theory, the liquid used in step (2) is not believed to simply function as a mere heat source to promote volatilisation of the absorbed composition in the polymer to be separated from the substrate. In particular, performing only step (1) of the method according to the invention and then heating the resulting composite structure to a temperature higher the boiling point of the absorbed composition in, for example a convection or microwave oven, has been found to not promote separation of the polymer bonded to the substrate. The liquid used in step (2) is therefore believed to not only provide for a rapid transfer of heat to the composite structure, but also impart certain solvent effects to the composite structure that facilitates separation of the polymer from the substrate.

After performing step (2), the resulting polymer composite structure may be washed and/or allowed to stand to remove residual liquid used in step (2) or composition used in step (1).

Having performed step (2), the resulting polymer composite structure can present at least a polymer component of the composite structure with a foamed/blistered/bubbled morphology. That morphology provides separation of polymer from the substrate thereby enabling the polymer to be more readily isolated from the polymer composite structure and collected for subsequent recycling.

If required, to promote further separation of polymer from the substrate the polymer composite material afforded in step (2) may be subjected to shear and/or comminution.

As used herein, the term "shear" or "shearing" is intended to mean unaligned forces acting on the polymer composite structure.

As used herein, the term "comminuted" or "comminution" is intended to mean breaking the polymer composite structure into smaller pieces.

Shearing and/or comminution of the polymer composite structure may be performed using equipment well known to those skilled in the art, for example crushing, shredding and cutting equipment.

Accordingly, in one embodiment the method comprises a further step of (3) shearing and/or comminuting the polymer composite structure provided in step (2).

After shearing and/or comminuting the polymer composite structure provided step (2), the polymer and substrate of the polymer composite structure will generally be substantially physically separated but can remain as a physical mixture. In that form, the separated polymer component can be readily isolated from the substrate component using techniques known in the art. For example, the polymer and substrate mixture may be separated using a float tank, Eddy current or cyclone.

Accordingly, in another embodiment the method comprises a further step of (3) shearing and/or comminuting the polymer composite structure provided in step (2) and isolating as separate components the separated polymer and the substrate. In that embodiment, the separated polymer and substrate components may be isolated using a float tank, Eddy current or cyclone.

Where a polymer composite structure comprises three or more components, two of which are different polymers to be separated, the polymer composite structure may need to be processed two or more times using the method of the invention in order to separate the two or more different polymers. For example, the polymer composite structure may be a laminate comprising an A/B/C laminate structure where A represent a polymer layer bonded to a composite substrate B/C, B represents a polymer layer different to A and C represents a non-polymer layer. In that case, the method of the invention may be performed a first time to separate and isolate polymer A from the polymer composite structure and also providing for isolated composite substrate B/C. Isolated composite substrate B/C may then be used as a polymer composite structure in performing the method of the invention a second time to separate polymer B bonded to the non-polymer substrate C as herein described.

Alternatively, the method according to the invention can advantageously allow for separation in one pass all three components of such an A/B/C laminate structure.

Applying the method of the invention multiple times to a polymer composite structure will generally be useful when the polymer composite structure comprises at least three different materials, two of which are different polymers. In particular, each of the different polymers may best be separated using a different composition comprising organic solvent. In that case, the method of the invention may be performed a first time to separate and isolate one polymer from the composite structure. The method may then be performed a second time using (i) polymer composite structure resulting from the first method pass, and (ii) different composition comprising organic solvent from that used in the first method pass, to separate and isolate a second polymer from the composite structure.

The present invention will herein after be described with reference to the following non-limiting examples.

EXAMPLES

General Method

The polymer composite structure was cut into manageable size pieces for performing the examples, which in the current examples was about 3 cm×2 cm.

The polymer composite structure was then placed in a container with composition comprising organic solvent for a specified period of time.

After the soaking period the composition comprising organic solvent was drained off and a liquid having a temperature higher than the boiling point of the composition comprising organic solvent was poured over the polymer composite structure located within the container. The action of pouring the liquid onto the polymer composite structure promoted separation of the polymer bonded to the substrate. In most cases separation was observed through formation of a bubbled, blistered or foamed appearance of the composite structure surface.

The liquid was then drained off the polymer composite structure and the resulting product was subjected to shear/comminution using rotating metal shredding blades.

The shear/comminution assisted with substantially separating the polymer from the substrate material providing for a mixture of the polymer and substrate.

The polymer and substrate were then isolated from each other by processing the mixture in a cyclone, Eddy current or float tank.

Example 1

Figure 2:
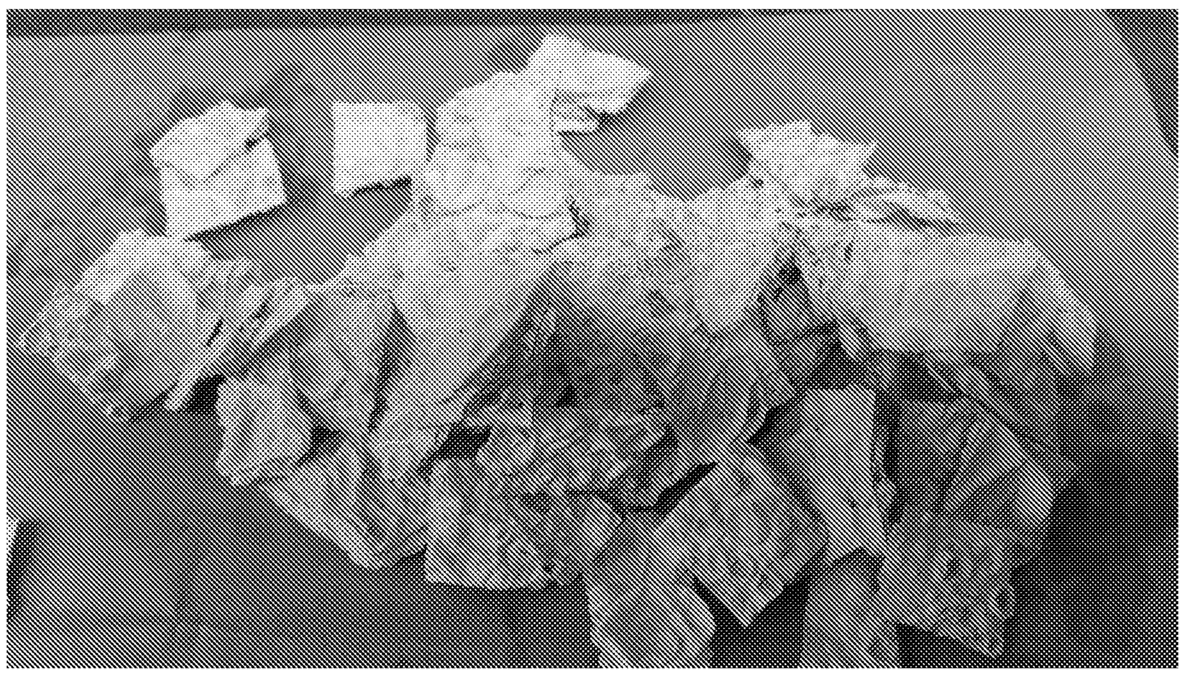
FIG. 2—illustrates the polymer composite structure shown in FIG. 1 having been processed according to the method of the invention. The outer polyvinyl chloride layers of the laminate structure have foamed/bubbled and at least partially separated from the inner polyester layer.
Figure 3:
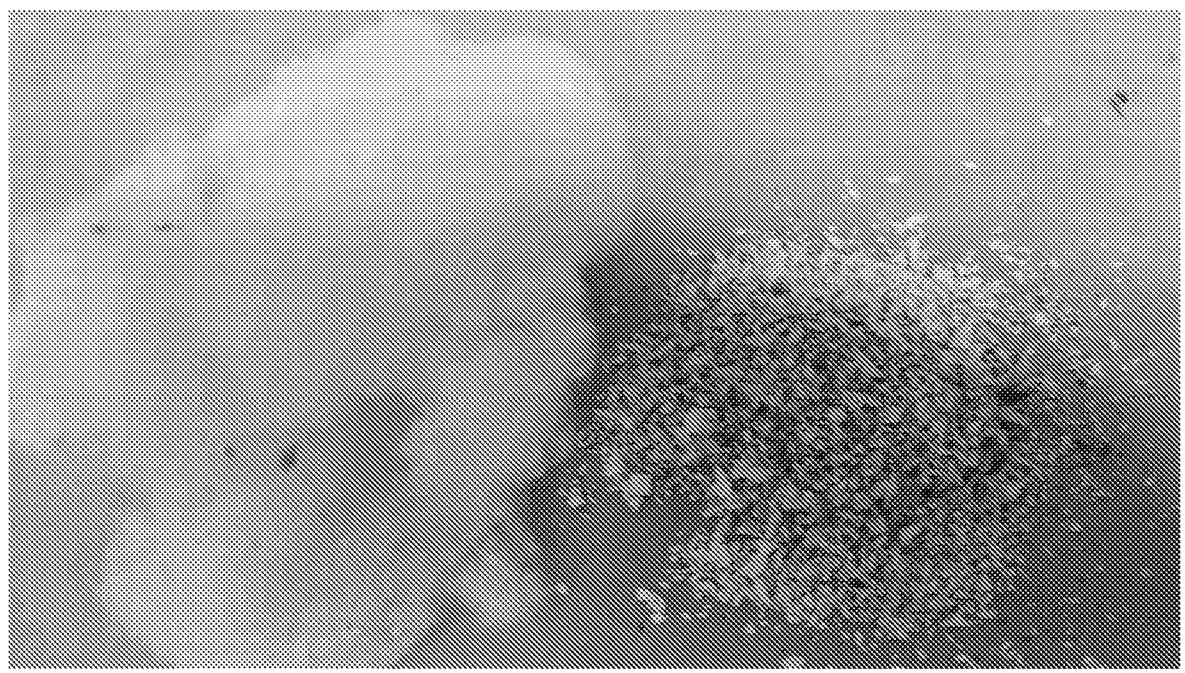
FIG. 3—illustrates the polymer composite structure shown in FIG. 2 having undergone comminution and separation by cyclone to isolate the polyester (left hand side) and polyvinylchloride (right hand side) from the polymer composite structure.

The general procedure outlined above was followed using a polyvinyl chloride/polyester/polyvinyl chloride laminate composite structure (see FIG. 1). Acetone was used as the composition comprising organic solvent and water at temperatures of 80° C., 90° C. and 100° C. was used as a liquid having a temperature higher than the boiling point of acetone. The laminate composite structure samples were first soaked in the acetone for about 12 hours. Upon applying the water to the acetone soaked composite structure, the composite structure developed a bubbled/blistered/foamed appearance on its outer surface (see FIG. 2). The resulting treated composite structure was then allowed to dry and was then comminuted to provide for a mixture of separated polyester and polyvinyl chloride. The polyester and polyvinylchloride mixture was then isolated into individual polymer components using a cyclone (see FIG. 3—where polyester presents on the left hand side and polyvinyl chloride presents on the right hand side).

Example 2

The same general procedure outlined in Example 1 was followed except chloroform was used as the composition comprising organic solvent and water at a temperature of 100° C. was used as a liquid having a temperature higher than the boiling point of chloroform. The polymer composite structure was successfully processed to isolate polyvinyl chloride and polyester.

Example 3

The same general procedure is outlined in Example 1 was followed except that ethyl acetate was used as the composition comprising organic solvent and water at a temperature of 100° C. was used as a liquid having a temperature higher than the boiling point of ethyl acetate. The polymer composite structure was successfully processed to isolate polyvinyl chloride and polyester.

Example 4

The same general procedure as outlined in Example 1 was followed except a mixture of acetone, chloroform and ethyl acetate in a volume ratio 10:1:1 was used as the composition comprising organic solvent and water at a temperature of 100° C. was used as a liquid having a temperature higher than the boiling point of composition mixture. The polymer composite structure was successfully processed to isolate polyvinyl chloride and polyester.

Example 5

The same general procedure as outlined in Example 1 was followed except canola oil at a temperature of 100° C. was used as the liquid having a temperature higher than the boiling point of the acetone. The polymer composite structure was successfully processed to isolate polyvinyl chloride and polyester.

Example 6

The same general procedure outlined in Example 1 was followed except the polymer composite structure was in the form of a tubular hose made from polyvinyl chloride having polyester reinforcement within the polymer matrix of the polyvinyl chloride and water at a temperature of 100° C. was used as a liquid having a temperature higher than the boiling point of acetone. The polymer composite structure was successfully processed to isolate polyvinyl chloride and polyester.

Example 7

The same general procedure outlined in Example 1 was followed except the polymer composite structure was in the form of a blister pack having a laminated structure comprising polyvinyl chloride bonded to an unknown polymer (not polyvinyl chloride) and the unknown polymer was bonded to aluminium foil (i.e. it had an A/B/C laminate structure where A=polyvinyl chloride, B=unknown polymer, and C=aluminium foil) and water at a temperature of 100° C. was used as a liquid having a temperature higher than the boiling point of acetone. That procedure afforded isolated polyvinyl chloride (A) and the polymer composite substrate (B/C).

The isolated polymer composite substrate (B/C) was then used in the same general procedure outlined in Example 1 except chloroform was used as the composition comprising organic solvent. That procedure afforded isolated unknown polymer (B) and isolated aluminium foil (C). Components (B) and (C) were isolated using Eddy current separator.

Example 8

The same general procedure outlined in Example 1 was followed except the polymer composite structure was in the form of a laminated structure comprising polyvinyl chloride bonded to a polypropylene/polyethylene composite substrate (i.e. it had an A/B/C laminate structure where A=polyvinyl chloride, B=polypropylene, and C=polyethylene), water at a temperature of 100° C. was used as a liquid having a temperature higher than the boiling point of acetone, and the soaking time in acetone was 1 hour. That procedure afforded a mixture of separated polyvinyl chloride (A), polypropylene (B) and polyethylene (C). Components (A), (B) and (C) were isolated using a float tank.

Example 9

The same general procedure outlined in Example 1 was followed except the polymer composite structure was in the form of a vinyl floor laminated structure, water at a temperature of 100° C. was used as a liquid having a temperature higher than the boiling point of acetone, and the soaking time in acetone was 1 hour. That procedure afforded a mixture of four separated components of the laminated structure without the need to subject the any form of shear/comminution.

Example 10

The same general procedure outlined in Example 1 was followed except the polymer composite structure was in the form of a car tyre, water at a temperature of 90° C. was used as a liquid having a temperature higher than the boiling point of acetone, and the soaking time in acetone was 1 hour. On contacting the acetone soaked tyre with the hot water, no blistering or foaming of the rubber was observed. However, bubbles were seen to be released from the tyre surface. The polymer composite structure was successfully processed to isolate rubber crumb, metal wire and polymer fibre.

Example 11

The same general procedure outlined in Example 1 was followed except the polymer composite structure was in the form of polymer coated copper wire, water at a temperature of 90° C. was used as a liquid having a temperature higher than the boiling point of acetone, and the soaking time in acetone was 30 minutes. Upon applying the water to the acetone soaked composite structure, the composite structure developed a bubbled/blistered/foamed appearance on its outer surface. The polymer composite structure was successfully processed to isolate polymer and copper wire.

Example 12

The same general procedure outlined in Example 1 was followed except the polymer composite structure was in the form of polymer/paper laminated cups (coffee cup, soft drink cup etc), water at a temperature of 90° C. was used as a liquid having a temperature higher than the boiling point of acetone, and the soaking time in acetone was 15 seconds. Before the composite structure was soaked in acetone, it was pre-treated by soaking it in water for 10 minutes. That pre-treatment enabled an outer layer of paper to be readily removed from the cups, leaving an internal polymer/paper laminated structure. That internal polymer/paper laminated structure was then soaked in the acetone. Upon applying the water to the acetone soaked composite structure, the polymer layer substantially separated from the paper layer. The polymer composite structure was successfully processed to isolate polymer and paper.

Comparative Example 1

The same general procedure outlined in Example 1 was followed except the acetone soaked polymer composite structure was not contacted with water having a temperature higher than the boiling point of the acetone. Instead, the acetone soaked polymer composite was placed (i) in an oven for 120 seconds having a temperature of 200° C., and (ii) in a microwave oven on high for 60, 90, 120 and 150 seconds. After heating in either oven the resulting polymer composite showed no visible separation of the polymer from the substrate. In the case of the microwave oven, the sample showed signs of charring. After heating the resulting polymer composite was subjected to shear/comminution using rotating metal shredding blades. However, no separation of the polymer from the substrate was observed.

Comparative Example 2

The same general procedure outlined in Example 10 was followed except the acetone soaked polymer composite structure was not contacted with water having a temperature higher than the boiling point of the acetone. Instead, the acetone soaked polymer composite was subjected to shear/comminution using rotating metal shredding blades. However, no separation of the polymer from the substrate was observed.

Comparative Example 3

The same cups used in Example 12 were directly subjected to shear/comminution using rotating metal shredding blades. Little if any separation of the polymer from the substrate material occurred.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The invention claimed is:

1. A method of promoting separation of polymer bonded to a substrate of different material, which collectively form at least part of a polymer composite structure, the method comprising:

(1) contacting the polymer composite structure with a composition comprising organic solvent which is absorbed within one or both of the polymer and the substrate, wherein the composition comprising organic solvent does not dissolve either the polymer or the substrate, and, thereafter, (2) contacting the polymer composite structure provided in step (1) with a liquid (i) having a temperature higher than the boiling point of the composition comprising organic solvent used in step (1), and (ii) that does not dissolve either the polymer or the substrate, the action of which promotes separation between the polymer and the substrate.

2. The method according to claim 1, wherein the substrate is located within a polymer matrix of the polymer.

3. The method according to claim 1, wherein the polymer composite structure comprises a laminate, and the polymer and substrate form layers of the laminate.

4. The method according to claim 1, wherein the polymer composite structure comprises a laminate in which the substrate is located in between two layers of polymer.

5. The method according to claim 1, wherein the polymer comprises polymer selected from polyvinyl halide, polyester, polyolefin, polyamide, styrenic polymer, rubber, combinations and copolymers thereof.

6. The method according to claim 1, wherein the substrate comprises a material selected from metal, polymer, glass fibre, carbon fibre, paper, cardboard and combinations thereof.

7. The method according to claim 6, wherein the substrate comprises polymer selected from polyvinyl halide, polyester, polyolefin, polyamide, styrenic polymer, rubber, combinations and copolymers thereof.

8. The method according to claim 1, wherein the polymer composite structure is a laminate comprising a polyester layer located in between two layers of polyvinyl chloride.

9. The method according to claim 1, wherein the polymer composite structure is a laminate comprising a layer of polyvinyl chloride, polyethylene, polypropylene, or polyvinylidene chloride bonded to a substrate comprising metal foil or wire.

10. The method according to claim 1, wherein the polymer composite structure is a laminate comprising a polyester or polyolefin layer bonded to paper, cardboard or a combination thereof.

11. The method according to claim 1, wherein the composition comprising organic solvent used in step (1) comprises organic solvent selected from aliphatic hydrocarbons, cyclic hydrocarbons, aromatic hydrocarbons, ketones, aldehydes, alcohols, ethers, esters, cyanoalkanes, halogenated alkanes, halogenated alkenes and combinations thereof.

12. The method according to claim 1, wherein the liquid used in step (2) is selected from organic solvent, water, natural or synthetic oil and combinations thereof.

13. The method according to claim 1, comprising a further step of (3) shearing and/or comminuting the polymer composite structure provided by step (2).

14. The method according to claim 1, comprising a further step of (3) shearing and/or comminuting the polymer composite structure provided by step (2) and then isolating as separate components the polymer and the substrate.

15. The method according to claim 14, wherein the polymer and the substrate are isolated as separate components using a float tank, Eddy current or cyclone.

16. The method according to claim 1, wherein the composition comprising organic solvent used in step (1) comprises acetone and the liquid used in step (2) comprises water.

17. The method according to claim 1, wherein the liquid used in step (2) has a temperature that is at least 20° C. higher than the boiling point of the composition used in step (1).

* * * * *